(12) United States Patent
Yamada

(10) Patent No.: US 11,345,034 B2
(45) Date of Patent: May 31, 2022

(54) ROBOT SYSTEM

(71) Applicant: Seiko Epson Corporation, Tokyo (JP)

(72) Inventor: Yoshihito Yamada, Chino (JP)

(73) Assignee: Seiko Epson Corporation

( * ) Notice: Subject to any disclaimer, the term of this patent is extended or adjusted under 35 U.S.C. 154(b) by 178 days.

(21) Appl. No.: 16/801,577

(22) Filed: Feb. 26, 2020

(65) Prior Publication Data

US 2020/0269424 A1    Aug. 27, 2020

(30) Foreign Application Priority Data

Feb. 27, 2019  (JP) .............................. JP2019-033589

(51) Int. Cl.
*B25J 19/06*    (2006.01)
*B25J 9/16*    (2006.01)
(Continued)

(52) U.S. Cl.
CPC ............. *B25J 9/1674* (2013.01); *B25J 19/02* (2013.01); *B25J 19/06* (2013.01); *B25J 21/00* (2013.01)

(58) Field of Classification Search
CPC ..... A61B 34/37; A61B 34/74; A61B 1/00149; A61B 2034/305; A61B 1/00006; A61B 1/00045; A61B 1/0016; B25J 13/085; B25J 19/02; B25J 19/06; B25J 21/00; B25J 11/005; B25J 13/06; B25J 9/0081; B25J 9/1633; B25J 9/1694; B25J 9/1697; B25J 9/1679; B25J 13/086; B25J 9/1674; G05B 2219/36445; G05B 2219/36454; Y10S 901/28; Y10S 901/30; H04B 3/56;
(Continued)

(56) References Cited

U.S. PATENT DOCUMENTS 5,956,465 A    9/1999  Takagi et al.
6,021,361 A *  2/2000  Taninaga ............. B25J 11/0065
                                                              700/182
(Continued)

FOREIGN PATENT DOCUMENTS

JP    H09-272096 A    10/1997
JP    3972350 B2    9/2007
(Continued)

OTHER PUBLICATIONS

Feng et al., Cross-coupling motion controller for mobile robots, 1993, IEEE, p. 35-43 (Year: 1993).*

(Continued)

*Primary Examiner* — McDieunel Marc
(74) *Attorney, Agent, or Firm* — Harness, Dickey & Pierce, P.L.C.

(57) ABSTRACT

A controller of a robot includes a first coupling section coupled to an object detecting device configured to detect an object. The controller is configured to control the robot in one of a first mode in which displacement speed of the robot does not exceed first speed and a second mode in which the displacement speed is second speed higher than the first speed, when the object detecting device is coupled to the first coupling section, switch the first mode and the second mode based on an output from the object detecting device, and control the robot in the first mode when the object detecting device is not coupled to the first coupling section.

4 Claims, 5 Drawing Sheets

(51) Int. Cl.
*B25J 19/02* (2006.01)
*B25J 21/00* (2006.01)

(58) Field of Classification Search
CPC ........ A61H 2201/5061; B01F 13/0277; B60K
2023/085; B60L 2240/12; B60L 2240/461
See application file for complete search history.

(56) References Cited

U.S. PATENT DOCUMENTS

| | | | | |
|---|---|---|---|---|
| 6,236,906 | B1* | 5/2001 | Muller | B25J 9/1676 700/258 |
| 6,522,949 | B1* | 2/2003 | Ikeda | G05B 19/425 219/121.63 |
| 6,917,856 | B2* | 7/2005 | Murata | B25J 9/1674 700/255 |
| 7,069,112 | B2* | 6/2006 | Graf | B25J 9/1682 700/248 |
| 7,373,220 | B2* | 5/2008 | Watanabe | B25J 9/1671 700/264 |
| 7,376,488 | B2* | 5/2008 | Watanabe | B25J 9/1664 700/257 |
| 10,661,443 | B2* | 5/2020 | Osaka | B25J 13/088 |
| 2005/0224479 | A1* | 10/2005 | Watanabe | G05B 19/4061 219/125.1 |
| 2014/0277725 | A1 | 9/2014 | Kouno et al. | |
| 2017/0259433 | A1* | 9/2017 | Takeuchi | B25J 9/1633 |
| 2017/0266815 | A1* | 9/2017 | Takeuchi | G05B 19/423 |
| 2018/0093378 | A1 | 4/2018 | Yamamoto et al. | |
| 2019/0389065 | A1* | 12/2019 | Horiguchi | B25J 19/022 |
| 2020/0101627 | A1* | 4/2020 | Yamazaki | B25J 9/12 |

FOREIGN PATENT DOCUMENTS

| | | |
|---|---|---|
| JP | 2010-208002 A | 9/2010 |
| JP | 2014-176934 A | 9/2014 |

OTHER PUBLICATIONS

Yamasaki et al., Grasp and Transport Control of a Chopsticks-Type Robot, 2009, IEEE, p. 197-202 (Year: 2009).*
Hill et al., Structural vibration for robotic communication and sensing on one-dimensional structures, 2015, IEEE, p. 2160-2165 (Year: 2015).*
Al-Ayasrah et al., Dual feed-back and feed-forward synchronized cross-coupled motion control for two-wheel mobile robot, 2005, IEEE, p. 55-60 (Year: 2005).*
Makino et al., Fault diagnosis of mobile robot based on short-term prediction using neural network, 2013, IEEE, p. 1300-1305 (Year: 2013).*
McCain, A hierarchically controlled, sensory interactive robot in the automated manufacturing research facility, 1985, IEEE, pg. (Year: 1985).*
Li et al., Development of a dual-mode mobile robot system for practical applications, 2011, IEEE, p. 1485-1490 (Year: 2011).*
Zhang et al., Design of the force sense unit for space robot end-effector, 2009, IEEE, p. 1727-1737 (Year: 2009).*

* cited by examiner

ROBOT SYSTEM

The present application is based on, and claims priority from JP Application Serial Number 2019-033589, filed Feb. 27, 2019, the disclosure of which is hereby incorporated by reference herein in its entirety.

BACKGROUND

1. Technical Field

The present disclosure relates to a robot system.

2. Related Art

JP A-9-272096 (Patent Literature 1) discloses a robot system capable of selecting, as an operation mode of a robot, a cooperation mode used in a state in which a person is present near the robot and an automatic mode used in a state in which a person is absent near the robot. A user of the robot switches the two modes.

However, in the related art described above, since the user switches the modes of the robot, when the robot is set in a mode different from the cooperation mode, an object and the robot are likely to interfere when the object approaches the robot.

SUMMARY

According to an aspect of the present disclosure, there is provided a robot system including a robot and a controller including a control section configured to control the robot. The controller includes a first coupling section coupled to an object detecting device configured to detect an object. The controller is configured to control the robot in one of a first mode in which displacement speed of the robot does not exceed first speed and a second mode in which the displacement speed is second speed higher than the first speed, when the object detecting device is coupled to the first coupling section, switch the first mode and the second mode based on an output from the object detecting device, and control the robot in the first mode when the object detecting device is not coupled to the first coupling section.

DESCRIPTION OF EXEMPLARY EMBODIMENTS

Figure 1:
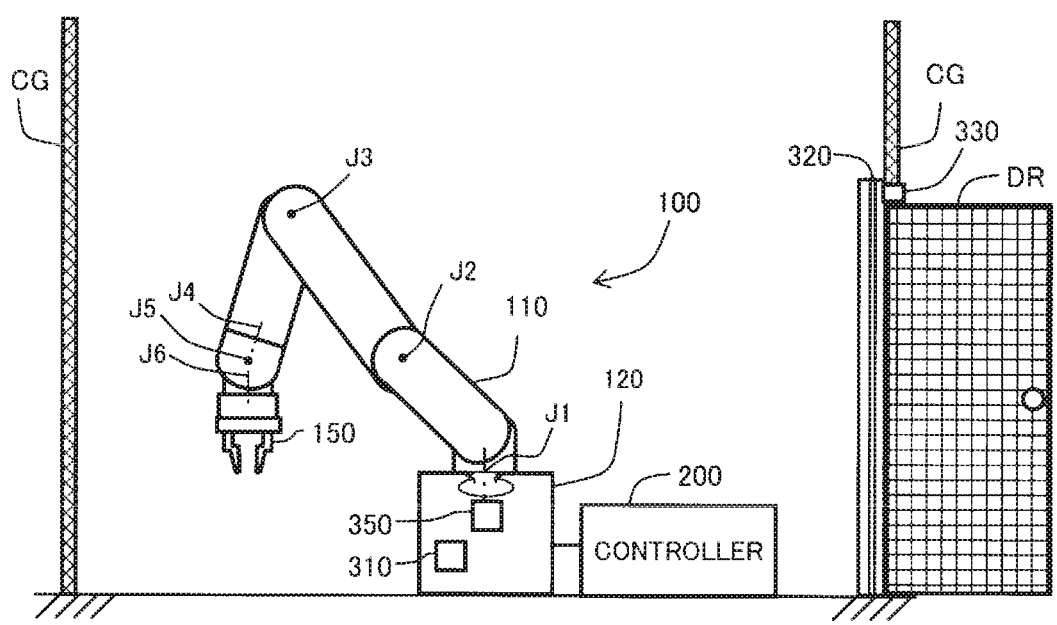
FIG. 1 is an explanatory diagram of a configuration example of a robot system.

FIG. 1 is an explanatory diagram showing an example of a robot system. The robot system includes a robot 100 and a controller 200. The periphery of a work region of the robot 100 is surrounded by a safety fence CG. A safety door DR through which people can enter and exit is provided in the safety fence CG.

The robot 100 includes an arm 110 and a base 120. The arm 110 is sequentially coupled by six joints J1 to J6. An end effector 150 is attached to the distal end portion of the arm 110. In this embodiment, a six-axis robot in which the arm 110 includes the six joints J1 to J6 is illustrated. However, a robot including any arm mechanism including one or more joints can be used.

In this robot system, an object detecting device 310, a light curtain 320, a safety door sensor 330, and a force detecting section 350 are provided as sensors. Detection signals of the sensors are supplied to the controller 200. The object detecting device 310 is equivalent to an "object detecting device" according to the present disclosure. The light curtain 320 and the safety door sensor 330 are equivalent to "another object detecting device" according to the present disclosure. A part or all of the sensors other than the object detecting device 310 can be omitted.

The object detecting device 310 is a sensor that detects an object such as a person approaching the robot 100. As the object detecting device 310, a proximity sensor capable of measuring a distance from the robot 100 to the object such as a millimeter wave radar or a laser range sensor can be used. The object detecting device 310 may be configured to, when the object approaches a distance equal to or smaller than a predetermined distance threshold, supply an output signal indicating the approach of the object to the controller 200. The object to be detected by the object detecting device 310 is an object other than work that is a work target of the robot 100. The object detecting device 310 may have a configuration in which a plurality of sensor elements are provided around the base 120 to detect approach of objects over the entire range of 360 degrees around the robot 100. A not-shown abnormality sensor for detecting whether an abnormality has occurred in the object detecting device 310 is desirably provided in the object detecting device 310. When an abnormality has occurred in the object detecting device 310, the object detecting device 310 notifies the controller 200 to that effect.

The light curtain 320 is an optical sensor that detects an object passing through the safety door DR. An object approaching the robot 100 may be detected by setting one or more light curtains 320 around the robot 100.

The safety door sensor 330 is an opening and closing sensor that detects an opening and closing state of the safety door DR.

The force detecting section 350 is a sensor that measures an external force applied to the arm 110. The force detecting section 350 is provided at the proximal end of the arm 110, that is, on the base 120 side of the first joint J1. This disposition is desirable because the force detecting section 350 can detect forces applied to all parts of the arm 110. As the force detecting section 350, for example, a six-axis force sensor can be used. However, a sensor that detects forces in fewer directions may be used. Instead of providing the force detecting section 350 on the proximal end side of the first joint J1, force sensors functioning as force detecting sections may be provided in the other one or more joints.

Figure 2:
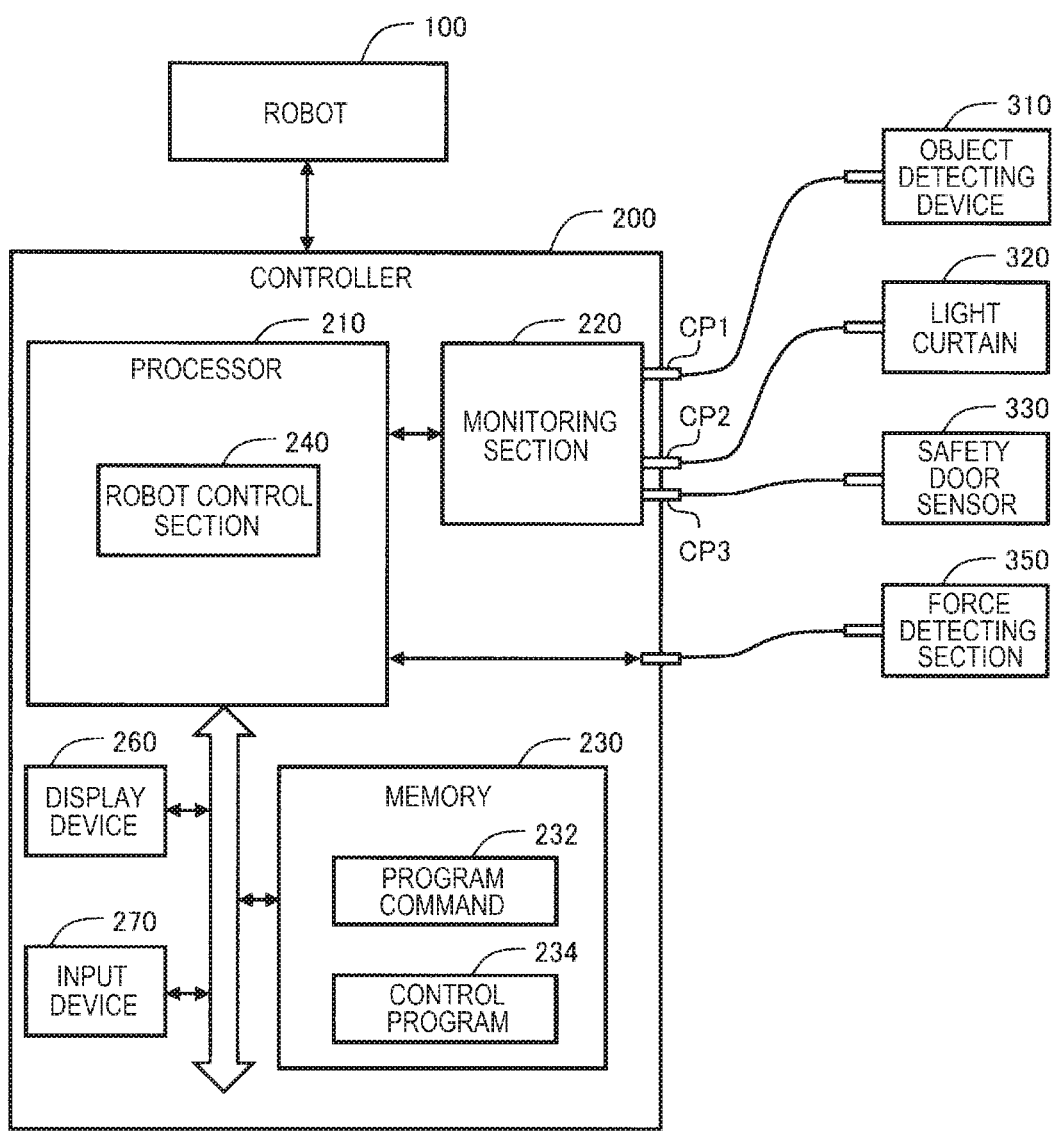
FIG. 2 is a functional block diagram of a controller.

FIG. 2 is a block diagram showing functions of the controller 200. The controller 200 includes a processor 210, a monitoring section 220, a memory 230, a display device 260, and an input device 270. The display device 260 and the input device 270 are used as operation devices of a user of the robot 100.

A program command 232 for realizing various functions of the processor 210 and a control program 234 describing work of the robot 100 are stored in the memory 230. The processor 210 executes the program command 232 to thereby realize a function as a robot control section 240 that controls the robot 100.

The monitoring section 220 has a function of monitoring the periphery of the robot 100 and notifying a result of the monitoring to the processor 210. The monitoring section 220 can be implemented as, for example, a printed board mounted with one or more electronic components. The monitoring section 220 includes an essential sensor port CP1 and optional sensor ports CP2 and CP3. In the present disclosure, the object detecting device 310 is coupled to the essential sensor port CP1. The light curtain 320 and the safety door sensor 330 are respectively coupled to the optional sensor ports CP2 and CP3. The essential sensor port CP1 is an essential coupling section for coupling the object detecting device 310 to the monitoring section 220 and is equivalent to a "first coupling section" according to the present disclosure. The optional sensor ports CP2 and CP3 are coupling sections nonessential for the monitoring section 220 and are equivalent to a "second coupling section" according to the present disclosure. An object detecting device of the same type as the object detecting device 310 coupled to the essential sensor port CP1 may be coupled to one of the optional sensor ports CP2 and CP2. A part or all of the optional sensor ports CP2 and CP3 may be omitted. In FIG. 2, a detection signal of the force detecting section 350 is supplied to the processor 210 not via the monitoring section 220. However, instead, the detection signal may be supplied to the processor 210 via the monitoring section 220.

As configuration of the controller 200, various configurations can be adopted other than the configuration shown in FIG. 2. For example, the processor 210 and the memory 230 may be deleted from the controller 200 shown in FIG. 1. The processor 210 and the memory 230 may be provided in another device communicably connected to the controller 200. In this case, an entire device obtained by combining the other device and the controller 200 functions as a controller for the robot 100. In another embodiment, the controller 200 may include two or more processors 210. In still another embodiment, the controller 200 may be realized by a plurality of devices communicably connected to one another. In these various embodiments, the controller 200 is configured as a device or a group of devices including one or more processors 210.

Figure 3:
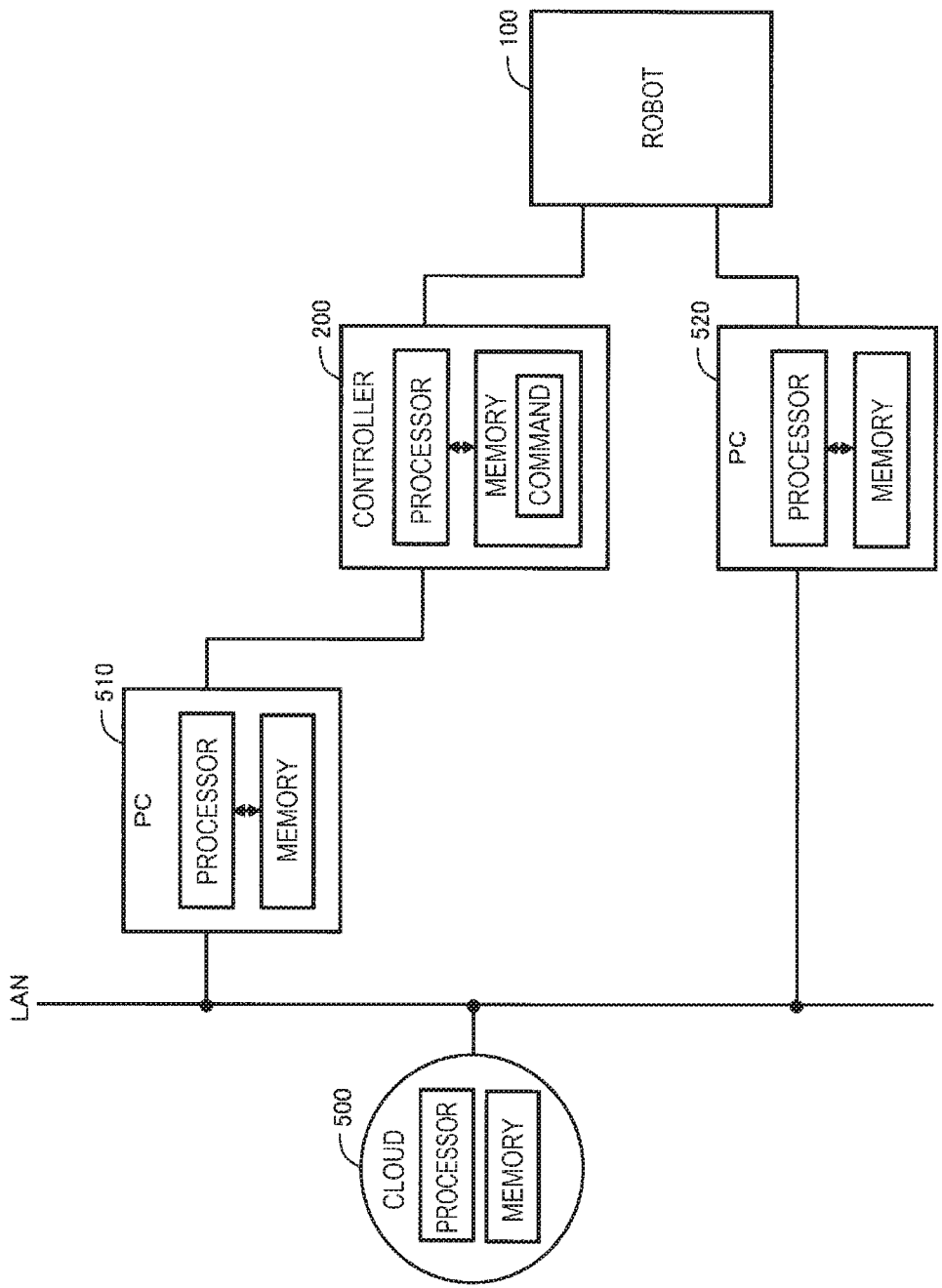
FIG. 3 is a conceptual diagram showing an example of the controller including a plurality of processors.

FIG. 3 is a conceptual diagram showing an example in which the controller for the robot is configured by a plurality of processors. In this example, besides the robot 100 and the controller 200 for the robot 100, personal computers 510 and 520 and a cloud service 500 provided via a network environment such as a LAN are drawn. The personal computers 510 and 520 respectively include processors and memories. A processor and a memory can also be used in the cloud service 500. A controller for the robot 100 can be realized using a part or all of the plurality of processors.

Figure 4:
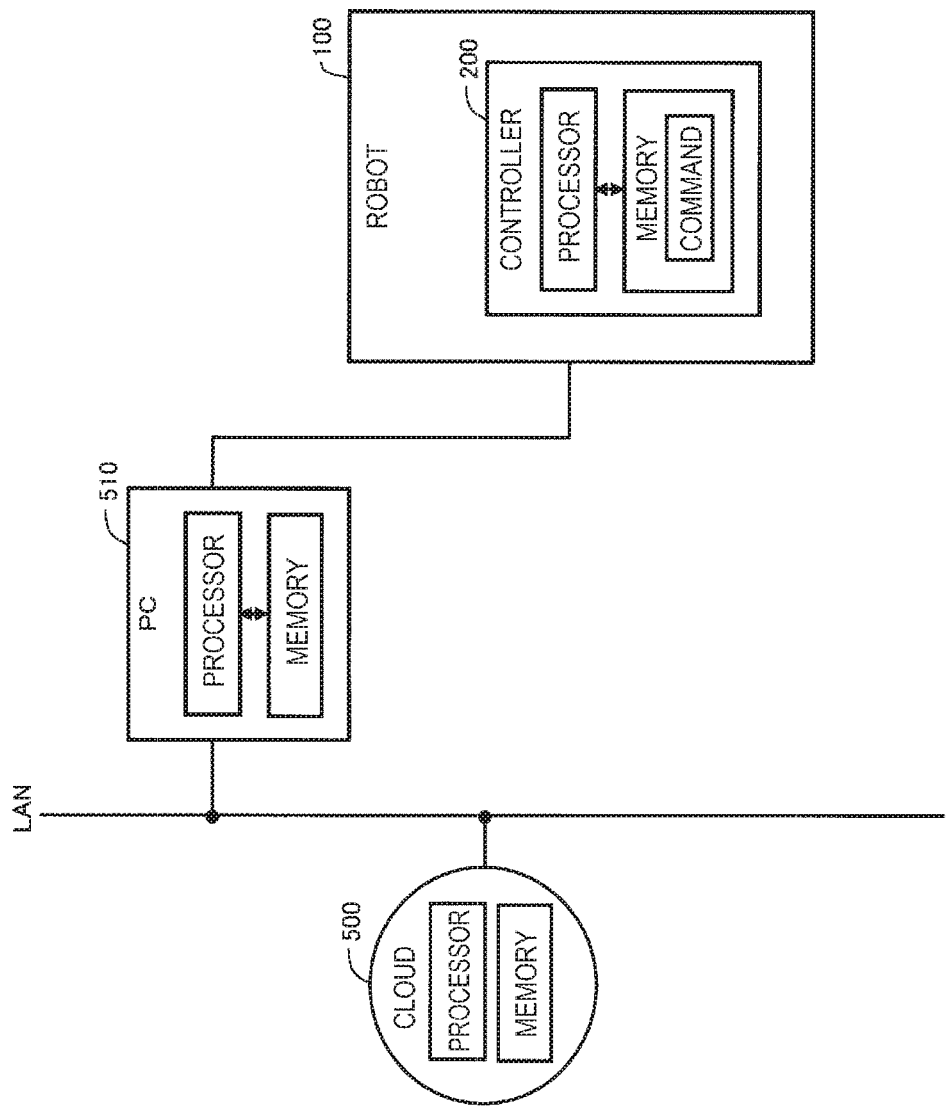
FIG. 4 is a conceptual diagram showing another example of the controller including the plurality of processors.

FIG. 4 is a conceptual diagram showing another example in which the controller for the robot is configured by the plurality of processors. The example shown in FIG. 4 is different from the example shown in FIG. 3 in that the controller 200 for the robot 100 is housed in the robot 100. In this example as well, the controller for the robot 100 can be realized using a part or all of the plurality of processors.

As a control mode of the robot 100 by the robot control section 240, a human cooperation mode and a normal mode explained below can be used. The human cooperation mode is equivalent to a "first mode" according to the present disclosure and the normal mode is equivalent to a "second mode" according to the present disclosure.

Human Cooperation Mode

In the human cooperation mode, the robot control section 240 controls the robot 100 in a low-speed operation assuming that the robot 100 and an object approaching the robot 100 come into contact with each other. Specifically, in the human cooperation mode, maximum displacement speed of the arm 110 is limited to preset first speed or less. The "maximum displacement speed" means a maximum value of moving speed in any parts of the arm 110 and the end effector 150. Usually, any one of moving speed of the distal end of the arm 110, moving speed of the distal end of the end effector 150, and moving speed of the joints is the maximum displacement speed. The first speed, which is an upper limit value of the maximum displacement speed in the human cooperation mode, is set to, for example, a value in a range of 100 mm/second or more and 500 mm/seconds or less. The human cooperation mode is equivalent to a mode in which the displacement speed of the robot 100 does not exceed the first speed. In the human cooperation mode, the monitoring section 220 executes monitoring of the control of the robot 100 in the low-speed operation in which the maximum displacement speed of the robot 100 is the first speed or less and an instruction for deceleration or stop of the robot 100 at the time when the contact of the robot 100 and the object is detected using the force detecting section 350. The maximum displacement speed of the robot 100 can be calculated from detection signals of not-shown encoders set in the joints J1 to J6 of the arm 110. Presence or absence of the contact of the robot 100 and the object determined using the force detecting section 350 can be determined, for example, according to whether a force detected by the force detecting section 350 exceeds a preset force threshold. The force threshold is set to a value equal to or larger than an upper limit value of a force assumed in advance in the work of the robot 100. In the human cooperation mode, when an unexpected force is detected by the force detecting section 350, it is determined that the object comes into contact with the robot 100. The robot 100 can be decelerated or stopped. Therefore, it is possible to reduce likelihood of occurrence of interference between an object such as a person and the robot 100.

Normal Mode

In the normal mode, the robot control section 240 controls the robot 100 in high-speed operation assuming that the robot 100 and an object approaching the robot 100 do not come into contact with each other. In the normal mode, the maximum displacement speed of the arm 110 is limited to second speed, which is higher than the first speed in the human cooperation mode, or less. The second speed, which is an upper limit value of the maximum displacement speed in the normal mode, is set to, for example, a value in a range of 500 mm/second or more and 3000 mm/second or less. The normal mode is equivalent to a mode in which the displacement speed of the robot 100 is the second speed higher than the first speed. In the normal mode, the monitoring section 220 performs monitoring of the control of the robot 100 in the high-speed operation in which the maximum displacement speed of the robot 100 is the second speed or less. In the normal mode, the monitoring section 220 does not need to perform the monitoring of presence or absence of contact of the robot 100 and the object.

The selection of the human cooperation mode and the normal mode is executed according to the following step-by-step rules.

C1) When the object detecting device 310 is not coupled to the essential sensor port CP1:
  the human cooperation mode is selected.
C2) When the object detecting device 310 is coupled to the essential sensor port CP1:

C2-1) when an abnormality is absent in the object detecting device 310:

C2-1-1) when an object approaches to a distance equal to or smaller than a predetermined distance threshold:

the human cooperation mode is selected.

C2-1-2) When an object is not approaching the distance equal to or smaller than the predetermined distance threshold:

the normal mode is selected.

C2-2) When an abnormality is present in the object detecting device 310:

the human cooperation mode is selected.

As shown in FIG. 2, the safety door sensor 330, which is the opening and closing sensor for the safety door DR, is coupled to the optional sensor port CP3. According to the mode selection rules described above, one of the human cooperation mode and the normal mode is selected irrespective of detection results of the sensors coupled to the optional sensor ports CP2 and CP3. Therefore, even when the safety door DR is open, it is possible to control the robot 100 in the human cooperation mode if the object detecting device 310 is coupled to the essential sensor port CP1 and an object is approaching the robot 100. As a result, there is an advantage that it is possible to continue work even when the safety door DR is open and improve productivity.

Figure 5:
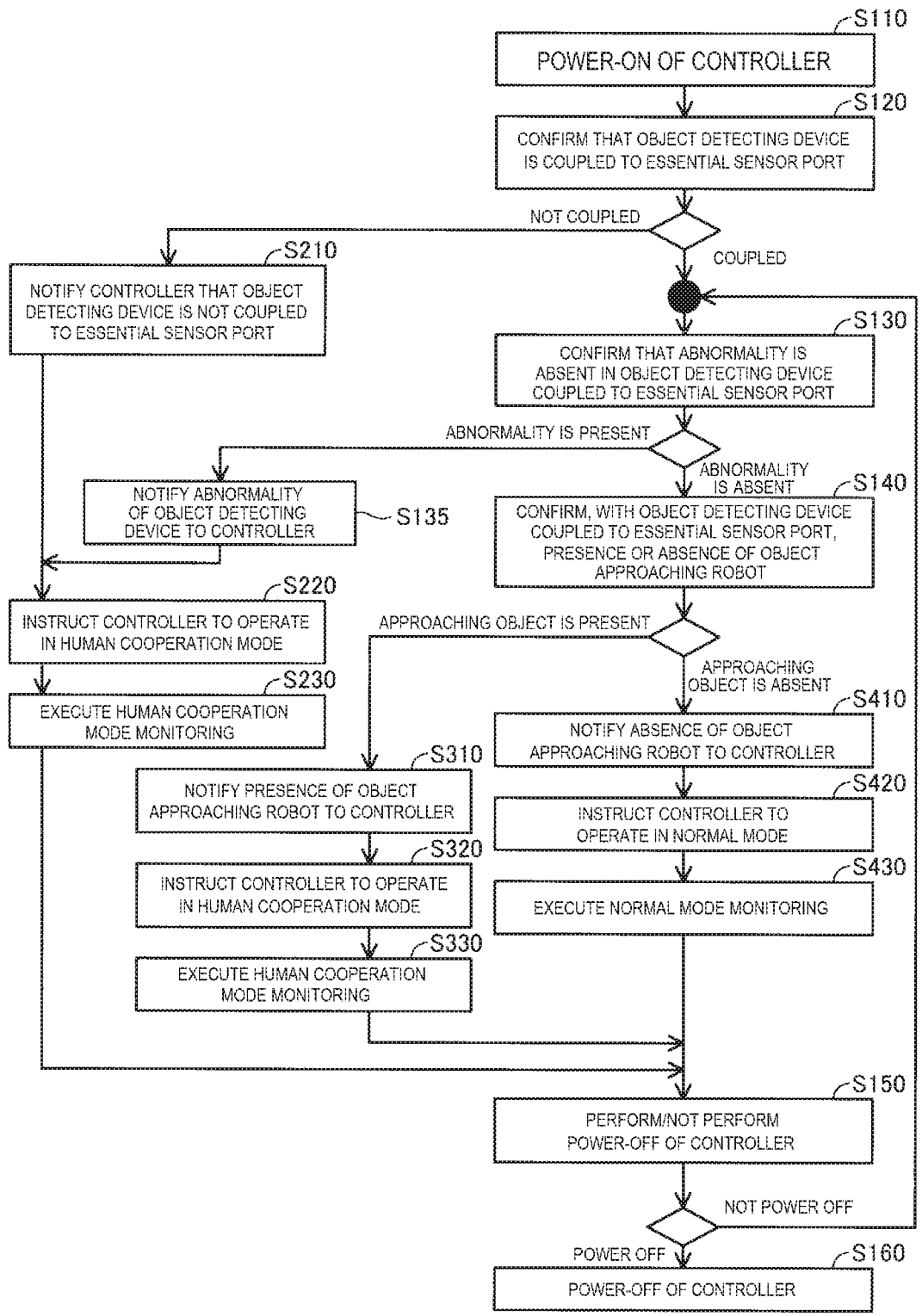
FIG. 5 is a flowchart showing a procedure for controlling a robot using a monitoring section.

FIG. 5 is a flowchart showing a control procedure for the robot 100 conforming to the rules described above. The control procedure is executed from power-on of the controller 200 in step S110 until power-off of the controller 200 in step S160.

After the start of the controller 200, in step S120, the monitoring section 220 confirms whether the object detecting device 310 is coupled to the essential sensor port CP1. If the object detecting device 310 is not coupled to the essential sensor port CP1, the monitoring section 220 proceeds to step S210 and notifies the robot control section 240 that the object detecting device 310 is not coupled to the essential sensor port CP1. At this time, the monitoring section 220 may display on the display device 260 that the object detecting device 310 is not coupled to the essential sensor port CP1 and notify the user of the robot 100 to that effect. In step S220, the monitoring section 220 instructs the robot control section 240 to operate in the human cooperation mode. In step S230, the monitoring section 220 continues to perform the monitoring of the robot 100 and the robot control section 240 in human cooperation mode monitoring. The "human cooperation mode monitoring" is a monitoring mode suitable for the human cooperation mode and is a monitoring mode assuming a case in which an object such as a person and the robot 100 are likely to come into contact with each other. Specifically, in the human cooperation mode monitoring, monitoring of the control of the robot 100 in the low-speed operation in which the maximum displacement speed of the robot 100 is the first speed or less and monitoring of presence or absence of contact of the arm 110 and the object determined using the force detecting section 350 are performed.

When the object detecting device 310 is coupled to the essential sensor port CP1 as a result of the confirmation in step S120, the monitoring section 220 proceeds to step S130 and performs abnormality detection for the object detecting device 310 coupled to the essential sensor port CP1. When an abnormality is detected in the object detecting device 310, the monitoring section 220 proceeds to step S135 and notifies the robot control section 240 that the abnormality is detected in the object detecting device 310 coupled to the essential sensor port CP1. At this time, the monitoring section 220 may display on the display device 260 that the abnormality is present in the object detecting device 310 and notify the user of the robot 100 to that effect. After step S135, steps S220 and S230 described above are executed.

When an abnormality is not detected in the object detecting device 310 as a result of the confirmation in step S130, the monitoring section 220 proceeds to step S140 and confirms, using the object detecting device 310, whether an object approaching the robot 100 is present around the robot 100. The determination of whether an object approaching the robot 100 is present can be executed, for example, according to whether the distance between the robot 100 and the object is the predetermined distance threshold or less. When detecting that an object approaching the robot 100 is present, the monitoring section 220 proceeds to step S310 and notifies the robot control section 240 that the object approaching the robot 100 is detected by the object detecting device 310 coupled to the essential sensor port CP1. At this time, the monitoring section 220 may display on the display device 260 that the object approaching the robot 100 is detected and notify the user of the robot 100 to that effect. In step S320, the monitoring section 220 instructs the robot control section 240 to operate in the human cooperation mode. In step S330, the monitoring section 220 is switched to the human cooperation mode monitoring.

On the other hand, when detecting in step S140 that an object approaching the robot 100 is absent, the monitoring section 220 proceeds to step S410 and notifies the robot control section 240 that an object approaching the robot 100 is not detected by the object detecting device 310. At this time, the monitoring section 220 may display on the display device 260 that an object approaching the robot 100 is absent and notify the user of the robot 100 to that effect. In step S420, the monitoring section 220 instructs the robot control section 240 to operate in the normal mode. In step S430, the monitoring mode of the monitoring section 220 is switched to normal mode monitoring. The "normal mode monitoring" is a monitoring mode suitable for the normal mode and is a monitoring mode assuming a case in which an object such as a person and the robot 100 are unlikely to come into contact with each other. Specifically, in the normal mode monitoring, monitoring of the control of the robot 100 in the low-speed operation in which the maximum displacement speed of the robot 100 is the first speed or less is perform. However, it is unnecessary to perform monitoring of presence or absence of contact of the arm 110 and the object determined using the force detecting section 350.

After steps S230, S330, and S430, in step S150, the monitoring section 220 confirms whether power-off of the controller 200 is performed. When the power-off of the controller 200 is not performed, the monitoring section 220 returns to step S130 described above. On the other hand, when the power-off of the controller 200 is performed, the monitoring section 220 ends the procedure shown in FIG. 5 in step S160.

When the object detecting device 310 is not coupled to the essential sensor port CP1 and the object detecting device 310 or another object detecting device is coupled to one of the optional sensor ports CP2 and CP3, the robot 100 may be controlled in the human cooperation mode. Then, even when the object detecting device 310 is not coupled to the essential sensor port CP1 and some object detecting device is coupled to one of the optional sensor ports CP2 and CP3, the robot 100 is controlled in the human cooperation mode. Therefore, it is possible to more surely reduce the likelihood of occurrence of interference between an object such as a person and the robot 100.

When approach of an object to the robot 100 is detected using the sensors coupled to the optional sensor ports CP2 and CP3, the mode switching may be executed as explained below. That is, when some object detecting device is coupled to one of the optional sensor ports CP2 and CP3, the monitoring section 220 confirms whether an abnormality is present in the object detecting device coupled to the optional sensor port CP2 or CP3. When an abnormality is present in the object detecting device, the monitoring section 220 notifies the robot control section 240 that the abnormality is detected in the object detecting device coupled to the optional sensor port. The monitoring section 220 instructs the robot control section 240 to operate in the human cooperation mode. At this time, the monitoring section 220 may continue to perform the monitoring of the robot 100 and the robot control section 240 in the human cooperation mode monitoring. On the other hand, when an abnormality is absent in the object detecting device coupled to optional sensor port CP2 or CP3, the human cooperation mode and the normal mode may be switched using a logical sum of a detection result of the object by the object detecting device 310 coupled to the essential sensor port CP1 and a detection result of the object by the other object detecting device coupled to the optional sensor port CP2 or CP3. Then, it is possible to more surely detect an object approaching the robot 100 compared with when only the object detecting device 310 coupled to the essential sensor port CP1 is used. Therefore, it is possible to more surely prevent the contact of the robot 100 and the object.

As explained above, in the embodiment explained above, when the object detecting device 310 is coupled to the essential sensor port CP1, the robot 100 is controlled in the normal mode when an object such as a person is not approaching the robot 100. Therefore, it is possible to reduce likelihood of deterioration in productivity. On the other hand, when an object such as a person approaches the robot 100, the robot 100 is controlled in the human cooperation mode in which the displacement speed of the robot 100 is lower than the displacement speed in the normal mode. Therefore, it is possible to reduce the likelihood of occurrence of interference between the object and the robot 100. The robot 100 is controlled in the human cooperation mode even when the object detecting device 310 is not coupled to the essential sensor port CP1. Therefore, it is possible to reduce the likelihood of occurrence of interference between the object and the robot 100 even in this case.

In the embodiment explained above, the robot 100 is controlled in the human cooperation mode when an abnormality occurs in the object detecting device 310. Therefore, as in the case in which the object detecting device 310 is not coupled to the essential sensor port CP1, it is possible to reduce likelihood of occurrence of interference between the object and the robot 100.

In the embodiment explained above, the object detecting device 310 detects the distance between the robot 100 and the object. The human cooperation mode and the normal mode are switched based on the distance. Therefore, when the distance between the object and the robot 100 is sufficiently small, it is possible to control the robot 100 in the human cooperation mode in which the displacement speed of the robot 100 is small. It is possible to further reduce the likelihood of occurrence of interference between the object and the robot 100.

In the embodiment explained above, in the human cooperation mode, the robot 100 is decelerated or stopped based on an output from the force detecting section 350. Therefore, it is possible to decelerate or stop the robot 100 when an unexpected force is detected by the force detecting section 350. It is possible to further reduce the likelihood of occurrence of interference between the object and the robot 100.

The present disclosure is not limited to the embodiment explained above and can be realized in various forms in a range not departing from the gist of the present disclosure. For example, the present disclosure can also be realized by aspects explained below. Technical features in the embodiment corresponding to technical features in the aspects explained below can be substituted or combined as appropriate in order to solve a part or all of the problems of the present disclosure or in order to achieve a part or all of the effects of the present disclosure. If the technical features are not explained as essential technical features in this specification, the technical features can be deleted as appropriate.

(1) According to a first aspect of the present disclosure, there is provided a robot system including a robot and a controller including a control section configured to control the robot. The controller includes a first coupling section coupled to an object detecting device configured to detect an object. The controller is capable of controlling the robot in one of a first mode in which displacement speed of the robot does not exceed first speed and a second mode in which the displacement speed is second speed higher than the first speed, when the object detecting device is coupled to the first coupling section, capable of switching the first mode and the second mode based on an output from the object detecting device, and controls the robot in the first mode when the object detecting device is not coupled to the first coupling section.

With this robot system, when the object detecting device is coupled to the first coupling section of the controller, the controller controls, when an object such as a person approaches the robot, the robot in the first mode in which the displacement speed of the robot is smaller. Therefore, it is possible to reduce likelihood of occurrence of interference between the object and the robot. The controller controls the robot in the first mode even when the object detecting device is not coupled to the first coupling section of the controller. Therefore, in this case as well, it is possible to reduce the likelihood of occurrence of interference between the object and the robot.

(2) In the robot system, when a signal indicating an abnormality of the object detecting device is input, the controller may control the robot in the first mode.

With this robot system, the controller controls the robot in the first mode when an abnormality occurs in the object detecting device. Therefore, as in the case in which the object detecting device is not coupled to the first coupling section, it is possible to reduce the likelihood of occurrence of interference between the object and the robot.

(3) In the robot system, the object detecting device may detect a distance between the robot and the object, and the controller may switch the first mode and the second mode based on the distance.

With this robot system, when the distance between the robot and the object is sufficiently small, the controller executes the control in the first mode in which the displacement speed of the robot is smaller. Therefore, it is possible to reduce the likelihood of occurrence of interference between the object and the robot.

(4) In the robot system, a force detecting section configured to detect a force may be provided in the robot, and, in the first mode, the control section may reduce the displacement speed or stop the robot based on an output from the force detecting section.

With this robot system, the robot can be decelerated or stopped when an unexpected force is detected by the force detecting section. Therefore, it is possible to reduce the likelihood of occurrence of interference between the object and the robot.

(5) In the robot system, the controller may further include a second coupling section coupled to the object detecting device or another object detecting device, and, when the object detecting device is not coupled to the first coupling section and the object detecting device or the other object detecting device is coupled to the second coupling section, the controller may control the robot in the first mode.

With this robot system, even when the object detecting device is not coupled to the first coupling section of the controller and some object detecting device is coupled to the second coupling section, the controller controls the robot in the first mode. Therefore, it is possible to surely reduce the likelihood of occurrence of interference between the object and the robot.

(6) In the robot system, the other object detecting device may be an opening and closing sensor for a safety door, the object detecting device may be coupled to the first coupling section, and the opening and closing sensor may be coupled to the second coupling section.

With this robot system, even when the safety door is open, it is possible to control the robot in the first mode if the object detecting device is coupled to the first coupling section of the controller and the object is approaching the robot. Therefore, it is possible to continue work when the safety door is open. It is possible to improve productivity.

What is claimed is:

1. A robot system comprising:
   a robot, the robot including:
      a base; and
      an arm rotatably connected to the base;
   a distance sensor configured to detect a distance between the arm and an object and generate an output signal when the distance sensor detects that the object is located within a predetermined distance to the arm; and
   a controller, the controller including:
      a connection port to which the distance sensor is selectively connected;
      a memory configured to store a program; and
      a processor configured execute the program so as to:
         detect whether the distance sensor is connected to the connection port of the controller;
         operate the robot in a first mode when the processor detects that the distance sensor is not connected to the connection port;
         move the arm only at a first displacement speed in the first mode, the first displacement speed being equal to or lower than a predetermined speed;
         operate the robot by switching between the first mode and a second mode when the processor detects that the distance sensor is connected to the connection port; and
         move the arm either at the first displacement speed or at a second displacement speed in the second mode based on the output signal from the distance sensor, the second displacement speed being faster than the predetermined speed.

2. The robot system according to claim 1, further comprising:
   a force detecting sensor configured to detect a force that is applied to the robot, and
   in the first mode, the processor is configured to reduce the first displacement speed or stop the robot based on an output from the force detecting sensor.

3. The robot system according to claim 1, wherein
   the controller further includes another connection port coupled to an object detecting device, and
   when the distance sensor is not coupled to the connection port and the object detecting device is coupled to the another connection port, the controller controls the robot in the first mode.

4. The robot system according to claim 3, wherein
   the object detecting device is an opening and closing sensor for a safety door.

* * * * *